Patented July 25, 1933

1,919,715

UNITED STATES PATENT OFFICE

HERBERT A. ENDRES, OF CUYAHOGA FALLS, OHIO, ASSIGNOR TO THE B. F. GOODRICH COMPANY, OF NEW YORK, N. Y., A CORPORATION OF NEW YORK

METHOD FOR PREPARING DISPERSIONS OF INSOLUBLE PIGMENTS

No Drawing.   Application filed January 8, 1929.   Serial No. 331,160.

This invention relates to the art of preparing liquid dispersions of finely divided pigments, and particularly to methods for preparing aqueous dispersions of insoluble inorganic pigments, such as barium sulphate.

Heretofore only comparatively few pigments, such as zinc oxide or carbon black, have been prepared with an average particle size as low as 1 micron (0.001 millimeters). It has been especially difficult to prepare inert pigments, such as barium sulphate, in a finely divided form.

The naturally occurring barium sulphate, commonly known as the mineral "barytes", is frequently somewhat discolored by traces of iron and is very hard, and difficult to grind to the degree of fineness which is desired in pigment dispersions. The calcined precipitated barium sulphate, known as "blanc fixe", can be prepared with a smaller particle size, but the practical limit of particle size has been found to be about 4 microns, that is, 0.004 mm. in diameter. Precipitated barium sulphate which contains a large proportion of particles finer than 4 microns cakes on drying, and cannot again be reduced to its original very fine degree of subdivision. Attempts to produce an exceptionally fine product have usually resulted in a material comprising aggregates much larger than the coarse crystals found in the normal product. Attempts have been made to employ the finely divided precipitated barium sulphate without drying it, but it has been found that particles of the desired fineness pass through all ordinary filters and settle from a suspension only very slowly, so that the process of washing out the soluble salts is very tedius and difficult. Furthermore, such precipitated barium sulphate, even when washed free of soluble salts is totally unsuited for most purposes for which dispersions are employed. For example, the precipitated barium sulphate cannot be admixed with coagulable dispersions of other substances, such as natural rubber latex, without causing the coagulation thereof.

This invention, in brief, comprises precipitating barium sulphate or other insoluble inorganic pigments in an extremely finely divided form, adding a small proportion of a soap to flocculate the precipitate, washing it free from soluble salts, and adding a further proportion of soap or other similar colloid to peptize and redisperse the precipitate. The precipitation of barium sulphate, for example, may be performed by mixing a solution of a barium compound with a solution of sulphuric acid or any sulphate. The barium sulphate is immediately precipitated in a finely divided state. From ¼% to 2% of a soluble soap is mixed with the wet product, which is then washed substantially free of soluble salts. Upon the further addition to the liquid suspension of from 2 to 5% of a soluble soap, with vigorous agitation, the precipitate is redispersed in a very finely divided and permanent suspension.

Apparently the beneficial effects secured by the practice of this invention must be ascribed to a specific action of the soaps. Other colloids do not appear to have the same remarkable flocculating effect in small proportions, combined with a distinct peptizing action in only slightly larger proportions. The soap apparently forms a protective coating around the individual particles, promoting or preventing agglomeration (or flocculation), according to the proportions used, and preventing the coagulation of other dispersions with which they may be admixed.

The method of this invention is applicable to the preparation of dispersions of any pigment which may be precipitated from solution in a very finely divided crystalline form. The more insoluble the pigment is, the easier it is to obtain very small and uniform particles. Such compounds as magnesium carbonate, calcium carbonate, lead chromate, zinc sulphide, calcium oxalate, and barium sulphate are therefore especially adapted to the treatment by the method of this invention. This method will be specifically described with reference to dispersions of barium sulphate, but it will be understood by those skilled in the art that by substituting other raw materials and making other obvious changes in the various steps of the method, dispersions of other fine pigments exhibiting the advantages attained by the practice of this invention may be prepared.

Preferably the precipitation of the barium sulphate is performed under such conditions that the average diameter of the particles is considerably under 0.5 microns. This is most readily accomplished by mixing concentrated solutions of a barium salt and a sulphate to form a barium sulphate gel. The gel can then be caused to crystallize in extremely minute crystals by agitating it violently. The barium salt may be barium sulphide, barium thiocyanate, barium nitrate, barium chloride, bromide or iodide, most of the other salts, in general, possessing too low a solubility. The sulphate is preferably sodium sulphate, but sulphuric acid, or any other soluble sulphate, such as ammonium sulphate, sodium aluminum sulphate (common alum), cadmium sulphate, zinc sulphate, ferric sulphate, manganese sulphate, etc. may be substituted therefor. If a sulphate of zinc, cadmium, copper, iron, nickel, tin, or manganese is employed together with barium sulphide, the corresponding lithopone will be formed. In general, however, it will be found more satisfactory to precipitate the barium sulphate alone by the reaction of barium chloride with sodium sulphate. The barium chloride may be the technical grade salt. The sodium sulphate may be the hydrated crystalline sulphate sold under the name of "Glauber's salt", or may be sodium bisulphate neutralized with sodium carbonate (soda ash). If the bisulphate is used, a slight excess of sodium carbonate should be added thereto in order to precipitate completely the iron which is almost invariably present as an impurity therein. For example, the production of 1000 parts of precipitated barium sulphate may be carried out as follows:

1050 parts by weight of crystalline barium chloride are dissolved in 2345 parts of soft water at 35 to 40° C., forming an approximately saturated solution, and the solution strained and brought to a temperature of about 33° C. 515 parts of sodium bisulphate are dissolved in a separate vessel in 1715 parts of soft water, and 227 parts of soda ash are slowly added to the solution. When the addition is complete, the sulphate solution should be faintly alkaline. The iron hydroxide and iron carbonates are filtered out and the liquid likewise brought to a temperature of about 33° C. This represents a solution containing approximately the maximum possible concentration of sodium sulphate. The clear sulphate solution is then added slowly to the barium chloride solution with violent agitation. For example, the barium chloride solution may be agitated by a high speed screw propeller agitator, the sodium sulphate solution being introduced in a slow stream close to the axis of the propeller. The two solutions coming into contact one with the other form a barium sulphate gel, which is immediately broken by the agitator, the motion of which causes the simultaneous crystallization of numerous very fine particles of barium sulphate, preventing the slow growth of large crystals. If a distinct excess of the sulphate is not employed, the solution should be tested for the presence of barium ions, and more sulphate added if necessary. The complete elimination of barium ions from the solution is important, since otherwise the soap added later would immediately be precipitated as the insoluble barium soap. Although a satisfactory product may be obtained by adding the barium chloride to the sulphate, it has been found that a somewhat finer precipitate may be obtained by adding the sulphate to the barium chloride as described above.

The suspension of barium sulphate thus produced contains large quantities of sodium chloride which is formed simultaneously with the barium sulphate by the double decomposition of the barium chloride and sodium sulphate. The soluble salt cannot conveniently be separated from the barium sulphate by the ordinary methods of filtration and washing, since the particles are so fine that they pass through filter papers or filter plates; nor by sedimentation and decantation, since the rate of sedimentation is extremely low. The particles of barium sulphate are therefore flocculated by the addition of a small proportion of a soap. It is probable that the find crystals formed by adding a sulphate to a solution of a barium salt are positively charged, perhaps because of the occlusion or adsorption of barium ions on the crystals. The addition of an alkaline soap solution probably neutralizes the positive charges, allowing individual particles to come in contact with one another and flocculate. The first apparent effect of the flocculation or coalescence of the fine particles is a very marked increase in viscosity, or thickening of the suspension. The important result, however, is that the flocs may be filtered without the slightest difficulty, or if washing by decantation is preferred, settle rapidly, leaving an absolutely clear supernatant fluid. The soap employed may be any soluble soap, such as sodium or potassium oleate, stearate, or palmitate, or a mixture of such soaps, but an ammonium soap such as ammonium oleate is preferred, since the alkalinity is more readily controlled than if a soap of a fixed metal is employed. As little as 0.4% or less of ammonium oleate, based on the dry weight of the barium sulphate, has been found to flocculate it satisfactorily, but larger proportions give somewhat better results. More than about 2% of this soap should not be employed, however, since such large proportions again peptize and redisperse the flocculated particles.

The precipitate prepared as described above is diluted with about 20,000 parts of soft water, and 4 parts of ammonium oleate dissolved in a small quantity of water are mixed with the liquid. In a short time the barium sulphate settles to the bottom of the container, leaving the major portion of the solution clear and free from solid matter. The clear solution is decanted off, the precipitate rediluted, etc. until the solution is substantially free from soluble salts.

The first step in the preparation of the dispersion is the peptization and redispersion of the flocculated pigment. This is accomplished by admixing an additional quantity of soap with the thick slurry resulting from the last washing and decantation. If ammonium oleate is again employed, the amount added is such as to bring the total concentration of soap up to about 4%, based on the weight of the barium sulphate. That is, 36 parts of ammonium oleate dissolved in water are added to the washed pigment, the suspension is diluted to the desired concentration and agitated vigorously to redisperse the barium sulphate. This may be accomplished by passing the suspension through a colloid mill or even by simply agitating the liquid in its container. For the best results, the ammonia content of the ammonium oleate solution should be so adjusted that the dispersion is slightly alkaline. An alkilinity corresponding to pH about 8 to 9.5 has been found satisfactory.

The finished dispersion contains particles of barium sulphate with a very uniform particle size, averaging less than 0.2 microns in diameter. The dispersion is quite stable and shows practically no tendency to settle. It may be mixed freely in any proportions with other alkaline dispersions, such as rubber latex, for example, without causing coagulation or diminishing the stability thereof. A microscopic examination of the dispersion shows a remarkable freedom from coarse particles and agglomerates.

The proportion of soap which must be employed to flocculate the pigment and the proportion required to peptize and redisperse it in any given case depend necessarily on the properties and particle size of the pigment, on the temperature of the liquid, on the solubility and other properties of the soap employed, on the alkalinity of the solution, etc. No general rule can therefore be stated, but the best conditions in each case must be established by experiment. The specific directions outlined above in connection with barium sulphate have proven very satisfactory in the preparation of dispersions of calcium or magnesium carbonate, lead chromate, lithopone and zinc oxide with such obvious changes in the first steps of precipitation as immediately suggest themselves.

The redispersion of the washed, flocculated precipitate may also be accomplished with the help of other peptizing agents than soap. For example, alkaline solutions of gelatine, casein, gum arabic, agar-agar etc. may be substituted in whole or in part for the soap solution employed to peptize the precipitate. However, such colloids do not satisfactorily flocculate the precipitate and should not, therefore, be employed for that purpose.

If it is desired to remove the last traces of soluble salts, the precipitate may be filtered after the last washing by decantation and the wet cake from the filter may be again stirred up with water and dispersed as hereinabove described; or the washing of the precipitate may be carried out by filtering and washing on the filter, rather than by recantation; or any other convenient method of washing out the soluble salts may be employed.

The dispersions prepared by the method of this invention are particularly valuable in the production of rubber composition directly from the rubber latex. The particle size is so small and uniform that comparatively large proportions of the dispersed pigment may be added to the rubber latex, and rubber articles made from the mixture show considerably improved strength and durability instead of being weakened by the addition.

For example, a latex composition was prepared by mixing natural rubber latex with dispersions of sulphur, accelerators, etc. in such proportions that the liquid mixture contained 100 parts by weight of rubber, 3 parts of sulphur, 3 parts of zinc stearate, 0.3 parts of accelerator, and 0.75 parts of anti-oxidant. To separate portions of this basic mixture were added dispersed barium sulphate prepared as hereinabove described, and, for comparison, ground silica. Rubber sheets were obtained from the various mixtures by electrodeposition, and the sheets dried and vulcanized for 20 minutes at 135° C. (275° F.) to produce an optimum cure. In the table below the proportion of pigment is indicated as volumes of pigment for each 100 volumes of rubber. The letter T indicates ultimate tensile strength in pounds per square inch, M represents the modulus or tensile stress at 500% elongation, and E represents the ultimate elongation in percent of original length.

*Tensile properties of latex rubber containing fine pigments*

| Proportion of pigment | T | M | E |
|---|---|---|---|
| None | 2883 | 481 | 880 |
| 5 barium sulphate | 4374 | 610 | 880 |
| 10 barium sulphate | 3780 | 762 | 840 |
| 15 barium sulphate | 4000 | 1091 | 800 |
| 20 barium sulphate | 3514 | 1199 | 740 |
| 20 silica (ground) | 2839 | 1844 | 600 |

It is evident that the strength of the rubber is greatly increased by the addition of the very finely divided precipitated barium sulphate, whereas the addition of the comparatively coarse ground silica greatly stiffens and weakens the rubber.

The practice of this invention has been described with reference to barium sulphate, but it is obvious that other pigments may be prepared by the same method, and employed in a like manner, the necessary changes in the individual steps being obvious to those skilled in the art. The invention is susceptible of numerous other modifications, some of which have been indicated. It is to be understood, however, that it is not intended to limit the invention to the specific embodiments herein described, nor to limit it by any theories which have been advanced in explanation of the results obtained, but to limit it only as may be required by the prior art, and as indicated in the appended claims.

It is also to be understood that the term "barium sulphate", as employed in the claims, unless otherwise limited, is used in a generic sense to include not only pure barium sulphate, but also mixed pigments consisting largely of barium sulphate, such as the lithopones.

I claim:

1. The method of preparing an aqueous dispersion of an insoluble pigment, which comprises precipitating an insoluble salt from aqueous solution in a finely divided form, adding a small proportion of a water soluble soap to the freshly precipitated pigment to flocculate it, washing it, and redispersing it by the addition of a further proportion of a peptizing agent.

2. The method of preparing an aqueous dispersion of an inorganic pigment, which comprises precipitating a pigment from aqueous solution, adding a small proportion of a water soluble soap to the freshly precipitated pigment to flocculate it, washing it, and redispersing it by the addition of a further proportion of a peptizing agent.

3. The method of preparing an aqueous dispersion of an inorganic pigment, which comprises precipitating a pigment from aqueous solution, adding a small proportion of a water soluble soap to the freshly precipitated pigment to flocculate it, washing it substantially free from soluble salts, and redispersing it by the addition of a further proportion of a water soluble soap.

4. The method of preparing an aqueous dispersion of an insoluble inorganic salt, which comprises precipitating the salt from aqueous solution in finely divided form, adding a small proportion of a soluble soap to the freshly precipitated salt suspension to flocculate the insoluble salt, washing it substantially free from water soluble salts, and redispersing it by vigorous agitation in the presence of an additional proportion of a water soluble soap.

5. The method of preparing an aqueous dispersion of barium sulphate, which comprises admixing aqueous solutions of a barium salt and a sulphate, adding a small proportion of a water soluble soap to the freshly precipitated barium sulphate to flocculate it, washing the precipitate, and redispersing it by the addition of a further proportion of a peptizing agent.

6. The method of preparing an aqueous dispersion of barium sulphate, which comprises admixing aqueous solutions of a barium salt and a sulphate, adding a small proportion of a water soluble soap to the freshly precipitated barium sulphate to flocculate it, washing the precipitate substantially free from soluble salts, and redispersing it by vigorous agitation in the presence of an additional proportion of a water soluble soap.

7. The method of preparing an aqueous dispersion of barium sulphate, which comprises admixing concentrated aqueous solutions of a barium salt and a soluble sulphate with vigorous agitation, adding a small proportion of a water soluble soap to the freshly precipitated barium sulphate to flocculate it, washing it, and redispersing it by vigorous agitation in the presence of a further proportion of a peptizing agent.

8. The method of preparing an aqueous dispersion of barium sulphate, which comprises admixing concentrated aqueous solutions of barium chloride and sodium sulphate with vigorous agitation, adding from $\frac{1}{4}\%$ to $2\%$ of ammonium oleate to the freshly precipitated barium sulphate to flocculate it, washing it substantially free from soluble salts, and redispersing it by vigorous agitation in the presence of sufficient additional ammonium oleate to bring the total amount to approximately $4\%$.

9. An aqueous dispersion of a precipitated pigment, characterized by a very fine, uniform particle size and substantially free from soluble salts, prepared by adding a small proportion of a water-soluble soap to the freshly precipitated pigment to flocculate it, washing the flocculated pigment, and redispersing it by the addition of a fuurther proportion of a peptizing agent.

10. An aqueous dispersion of precipitated barium sulphate, characterized by a very fine, uniform particle size and substantially free from soluble salts, prepared by adding a small proportion of a water-soluble soap to the freshly precipitated barium sulphate to flocculate it, washing the flocculated barium sulphate, and redispersing it by the addition of a further proportion of a peptizing agent.

11. A stable aqueous dispersion of a precipitated inorganic pigment, characterized by a very fine, uniform particle size and substantially free from soluble salts, prepared by adding a small proportion of a water-soluble soap to the freshly precipitated pigment to flocculate it, washing the flocculated pigment, and redispersing it by the addition of substantial proportions of a water-soluble soap.

12. A stable aqueous dispersion of precipitated barium sulphate, characterized by a very fine, uniform particle size and substantially free from soluble salts, prepared by adding a small proportion of ammonium oleate to the freshly precipitated barium sulphate to flocculate it, washing the flocculated barium sulphate, and redispersing it by adding enough more ammonium oleate to bring the total content above 2%.

HERBERT A. ENDRES.